United States Patent
Lee et al.

(10) Patent No.: US 11,507,299 B2
(45) Date of Patent: Nov. 22, 2022

(54) METHOD FOR PROCESSING DATA AND ELECTRONIC DEVICE SUPPORTING SAME

(71) Applicant: Samsung Electronics Co., Ltd., Gyeonggi-do (KR)

(72) Inventors: Manjong Lee, Gyeonggi-do (KR); Changheun Lee, Gyeonggi-do (KR)

(73) Assignee: Samsung Electronics Co., Ltd

(*) Notice: Subject to any disclaimer, the term of this patent is extended or adjusted under 35 U.S.C. 154(b) by 71 days.

(21) Appl. No.: 17/041,837

(22) PCT Filed: Mar. 29, 2019

(86) PCT No.: PCT/KR2019/003732
§ 371 (c)(1),
(2) Date: Sep. 25, 2020

(87) PCT Pub. No.: WO2019/190277
PCT Pub. Date: Oct. 3, 2019

(65) Prior Publication Data
US 2021/0011654 A1    Jan. 14, 2021

(30) Foreign Application Priority Data
Mar. 29, 2018 (KR) .................. 10-2018-0036511

(51) Int. Cl.
*G06F 3/06* (2006.01)

(52) U.S. Cl.
CPC .......... *G06F 3/0655* (2013.01); *G06F 3/0604* (2013.01); *G06F 3/0638* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 6,604,158 B1 * 8/2003 Fallon ................ H04N 21/4334
                                                            710/68
6,748,457 B2 * 6/2004 Fallon .................... G06F 9/4401
                                                            711/112
(Continued)

FOREIGN PATENT DOCUMENTS

| JP | 4821042 | 11/2011 |
| KR | 1020120052028 | 5/2012 |
| KR | 1020160132204 | 11/2016 |

OTHER PUBLICATIONS

K. A. S. Immink and H. D. L. Hollmann, "Prefix-synchronized run-length-limited sequences," in IEEE Journal on Selected Areas in Communications, vol. 10, No. 1, pp. 214-222, Jan. 1992, doi: 10.1109/49.124480. (Year: 1992).*
(Continued)

*Primary Examiner* — Daniel C. Chappell
(74) *Attorney, Agent, or Firm* — The Farrell Law Firm, P.C.

(57) ABSTRACT

An electronic device according to various embodiments of the present invention comprises a host device and a block device electrically connected to the host device, wherein the block device comprises a first memory and a controller electrically connected to the first memory, and the controller receives a write request for first data form the host device, determines whether the first data is pattern data configured in a form in which an assigned number of bit values are repeated, and, in response to the first data being determined to be the pattern data, controls the first memory to store the assigned number of bit values of the first data in a logical to physical mapping table after mapping the assigned number of bit values to a logical address indicated by the write request.

13 Claims, 10 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | |
|---|---|---|---|---|
| 7,010,719 B2* | 3/2006 | Nobuyoshi | ........... | G06F 3/0655 714/24 |
| 8,230,300 B2* | 7/2012 | Perlmutter | ........... | G06F 3/0638 714/763 |
| 8,645,664 B1* | 2/2014 | Colgrove | .............. | G06F 3/0665 711/208 |
| 8,856,438 B1* | 10/2014 | Warner | ................ | G06F 3/0676 711/205 |
| 8,924,632 B2* | 12/2014 | Post | ..................... | G06F 3/0608 711/E12.008 |
| 9,134,918 B2* | 9/2015 | Yurzola | .............. | G06F 12/0246 |
| 9,231,615 B2* | 1/2016 | Chen | .................... | G06F 3/0608 |
| 9,235,502 B2* | 1/2016 | Khmelnitsky | ........ | G06F 3/0604 |
| 9,645,758 B2* | 5/2017 | Peterson | ................ | G06F 3/064 |
| 9,690,490 B2* | 6/2017 | Yeh | ......................... | G06F 11/00 |
| 10,102,205 B2* | 10/2018 | Ordentlich | ............. | G06F 16/00 |
| 10,540,095 B1* | 1/2020 | Cheng | .................... | G06F 16/14 |
| 10,564,848 B2* | 2/2020 | Maeda | ................. | G06F 3/0679 |
| 10,860,245 B2* | 12/2020 | Zhao | ................... | G06F 12/0868 |
| 2008/0288436 A1* | 11/2008 | Priya N V | ......... | G06F 12/0246 706/48 |
| 2009/0150599 A1* | 6/2009 | Bennett | .............. | G06F 11/1471 711/E12.019 |
| 2010/0095055 A1 | 4/2010 | Gorobets | | |
| 2011/0161559 A1* | 6/2011 | Yurzola | ................ | G06F 3/0608 711/E12.078 |
| 2012/0124276 A1 | 5/2012 | Ahn et al. | | |
| 2016/0328155 A1 | 11/2016 | Um | | |
| 2017/0017571 A1 | 1/2017 | Choi et al. | | |
| 2017/0115900 A1* | 4/2017 | Camp | ................... | G06F 3/0652 |

OTHER PUBLICATIONS

PCT/ISA/210 Search Report issued on PCT/KR2019/003732, Jun. 27, 2019, pp. 4.

PCT/ISA/237 Written Opinion issued on PCT/KR2019/003732, Jun. 27, 2019, pp. 5.

* cited by examiner

METHOD FOR PROCESSING DATA AND ELECTRONIC DEVICE SUPPORTING SAME

PRIORITY

This application is a National Phase Entry of International Application No. PCT/KR2019/003732, which was filed on Mar. 29, 2019, and claims priority to Korean Patent Application No. 10-2018-0036511, filed in the Korean Intellectual Property Office on Mar. 29, 2018, the content of each of which is incorporated herein by reference.

TECHNICAL FIELD

Various embodiments of the present disclosure relate to a method for processing data and an electronic device for supporting the same.

BACKGROUND ART

A flash memory is widely used in a portable electronic device such as a digital camera, an MP3 player, a handheld phone, a PDA, etc. by virtue of the merit of low power, miniaturization, etc. In recent years, as a capacity of the flash memory is greatly increased, the flash memory is being used replacing a hard disk storage device in a personal computer, a server, etc.

DISCLOSURE OF INVENTION

Technical Problem

A flash memory performs an erase-before-write operation due to its own physical characteristic. When the flash memory performs a write operation in a page, if there is data already stored in the page, the flash memory can perform the write operation after erasing a block which the page belongs to.

Because the flash memory does not support overwrite, the flash memory has to perform more operations in order to perform the write operation compared to other memories. Due to a limitation of the flash memory material itself, there can be a limitation in the number of times of write.

Various embodiments of the present disclosure relate to a method for processing data and an electronic device for supporting the same, capable of storing data configured in a form of repeating a specified number of bit values, in a logical to physical mapping table.

Technological solutions the disclosure seeks to achieve are not limited to the above-mentioned technological solutions, and other technological solutions not mentioned above would be able to be clearly understood by a person having ordinary skill in the art from the following statement.

Solution to Problem

An electronic device of various embodiments of the present disclosure may include a host device and a block device electrically connected to the host device. The block device may include a first memory and a controller electrically connected to the first memory. The controller may receive a write request for first data from the host device, and determine whether the first data is pattern data configured in a form of repeating a specified number of bit values, and in response to determining that the first data is the pattern data, and control the first memory to map the specified number of bit values of the first data with a logical address indicated by the write request and store the specified number of bit values in a logical to physical mapping table.

A method for processing data of various embodiments of the present disclosure may include receiving, by a controller of a block device included in the electronic device, a write request for first data from a host device included in the electronic device, and determining whether the first data is pattern data configured in a form of repeating a specified number of bit values, and in response to determining that the first data is the pattern data, controlling the first memory included in the block device to map the specified number of bit values of the first data with a logical address indicated by the write request and store the specified number of bit values in a logical to physical mapping table.

Advantageous Effects of Invention

A method for processing data and an electronic device for supporting the same of various embodiments of the present disclosure may secure more data storage spaces in a memory by storing data configured in a form of repeating a specified number of bit values in a logical to physical mapping table, and extend a lifetime of the memory through a decrease of the number of times of write and improve the performance of the memory by omitting part of an operation of processing data.

BEST MODE FOR CARRYING OUT THE INVENTION

Figure 1:
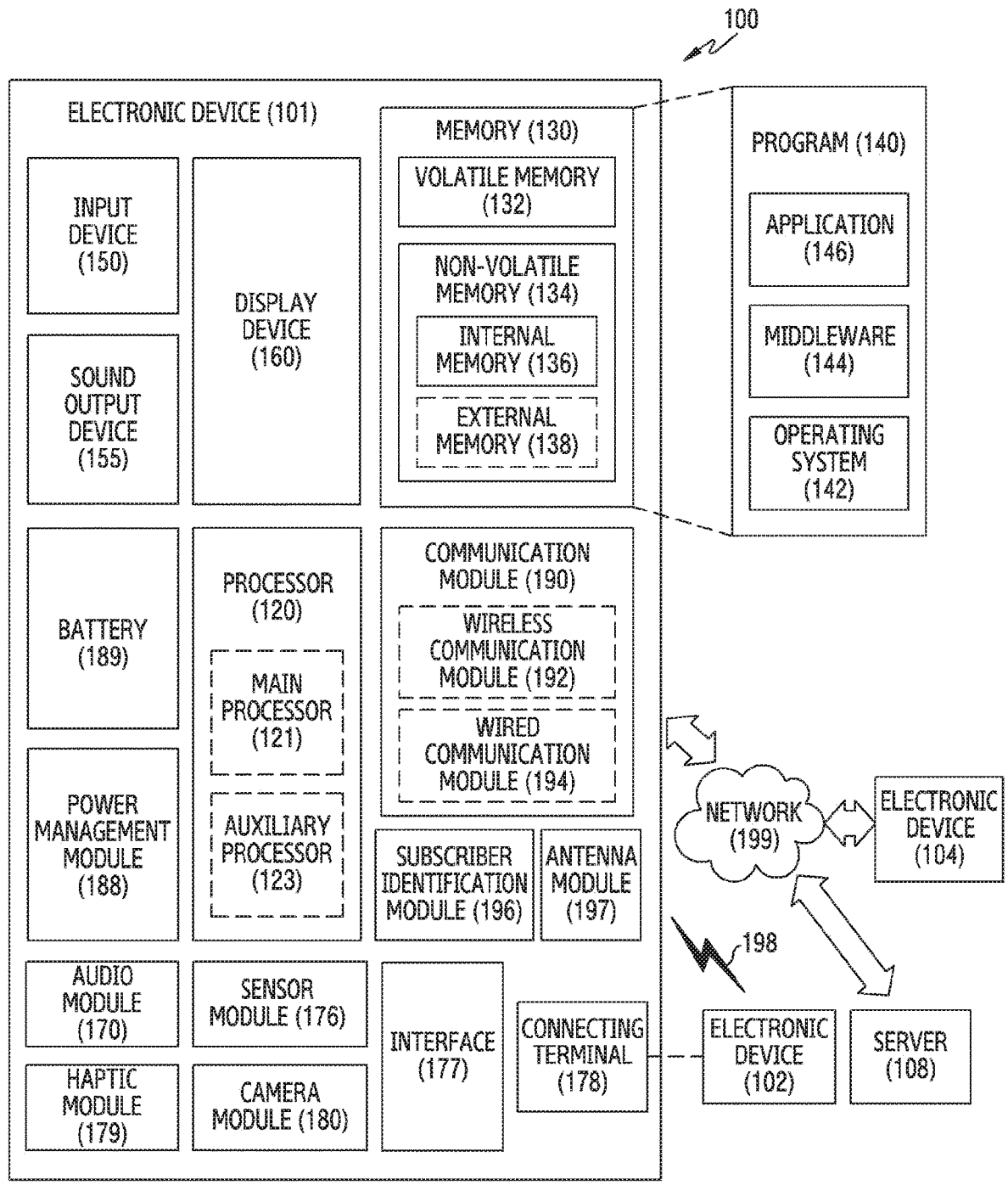
FIG. 1 is a block diagram of an electronic device within a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
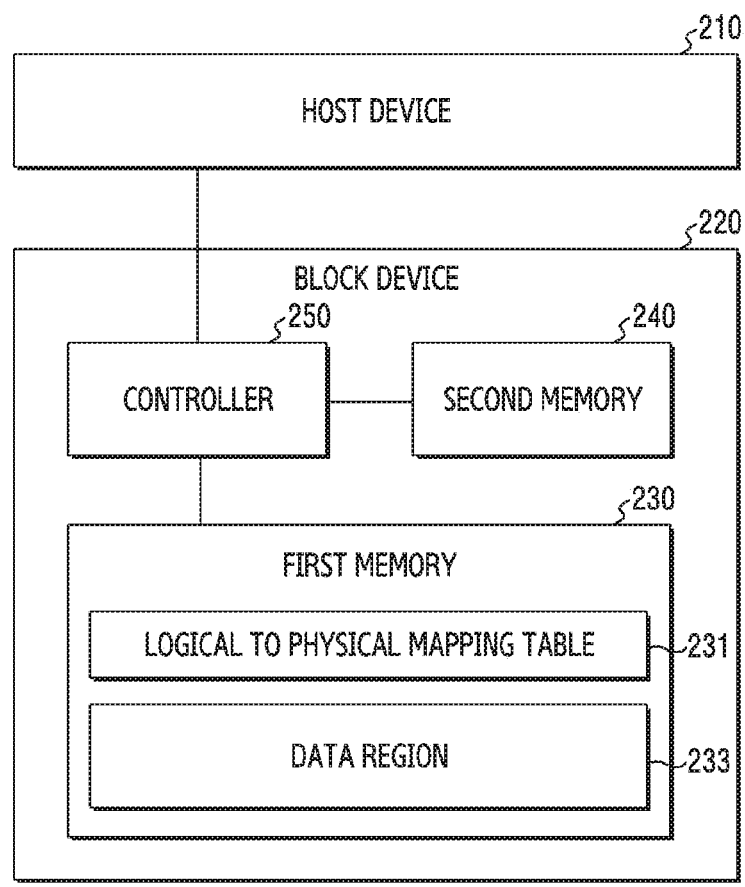
FIG. 2 is a diagram illustrating an electronic device for processing data, according to various embodiments of the present disclosure.

FIG. 2 is a diagram illustrating the electronic device 101 for processing data, according to various embodiments of the present disclosure.

Referring to FIG. 2, the electronic device 101 may include a host device 210 and a block device 220.

In an embodiment, the host device 201 may include at least part of the processor 120 of FIG. 1. In an embodiment, the host device 201 may be the main processor 121 (e.g., a central processing device or an application processor).

In an embodiment, the host device 210 may deliver a request for processing data to the block device 220. For example, the host device 210 may deliver a request for writing (or registering, or recording, or storing) data in the block device 220 to the block device 220. In another example, the host device 210 may deliver a request for reading (or reading out, or receiving a delivery of) data from the block device 220. However, a request for processing data delivered to the block device 220 by the host device 210 is not limited to the above-described example.

In an embodiment, the block device 220 (or storage) may include at least part of the memory 130 of FIG. 1. For example, the block device 220 may include at least part of the volatile memory 132 and the non-volatile memory 134.

In an embodiment, the block device 220 may include a first memory 230, a second memory 240, and a controller 250. In an embodiment, the block device 220 may include a package device including the controller 250 and capable of storing data. For example, the block device 220 may include a NAND flash memory including the controller 250, an embedded multimedia card (eMMC), a universal flash memory (UFS), etc. However, the block device 220 is not limited to the above-described example, and may include all of devices including the controller 250 and capable of storing data.

In an embodiment, the first memory 230 may include a logical to physical mapping table 231 and a data region 233 (or space). In an embodiment, the first memory 230 may be a non-volatile memory (e.g., the non-volatile memory 134). In an embodiment, the first memory 230 may be called a physical storage, etc. In an embodiment, the first memory 230 may store data by the unit of page, block, or subset of the page. For description convenience below, a description is made on the assumption that data is stored by the unit of page in the first memory 230.

In an embodiment, the logical to physical mapping table 231 may map a logical address and a physical address or a repeated bit value of data configured in a form of repeating a specified number of bit values, and store (or write, or record, or register).

Below, the data configured in a form of repeating a specified number of bit values is called 'pattern data'. Below, the repeated bit value of the pattern data is called a 'data pattern'. Below, a bit count of the data pattern is called a 'bit unit of the data pattern'.

In an embodiment, the logical to physical mapping table 231 may include a region (below, called a 'logical region') storing a logical address, and a region (below, called a 'physical region') storing a physical address or data pattern mapped with the logical address.

In an embodiment, the bit count of the data pattern (or an amplitude of the data pattern) may be less than a bit count of the physical region (or an amplitude of the physical region), and the bit count of the data pattern may correspond to a divisor of a bit count of a page.

In an embodiment, the pattern data may be data which is configured in a form of continuously repeating a data pattern in which the bit count of the data pattern is less than the bit count of the physical region and the bit count of the data pattern corresponds to the divisor of the bit count of the page.

In an embodiment, the logical to physical mapping table 231 may store (or include) a value of a bit (below, a 'flag') which indicates whether data stored in a physical region is a physical address or is a data pattern, besides a logical address and the physical address or the data pattern. In an embodiment, the flag may be stored in a remaining region (or space) of the logical to physical mapping table 231. For example, the flag may be stored in a location where a first more significant bit (or most significant bit) of the physical region will be stored. In another example, the flag may be stored in a remaining location (e.g., a location next to (or rear or right) a first less significant bit of the physical address or data pattern) after the physical address or data pattern is stored in the physical region. However, the location of the logical to physical mapping table 231 storing the flag is not limited to the aforementioned example.

Figure 3:
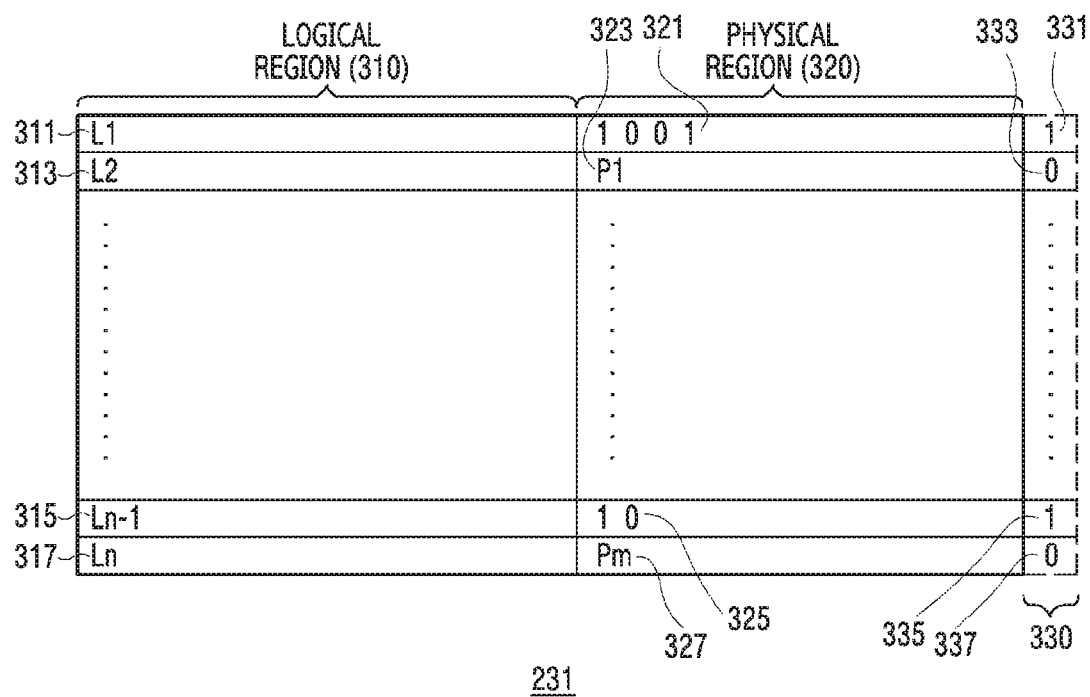
FIG. 3 is a diagram illustrating a logical to physical mapping table, according to various embodiments of the present disclosure.

FIG. 3 is a diagram illustrating the logical to physical mapping table 231, according to various embodiments of the present disclosure.

Referring to FIG. 3, in an embodiment, the logical to physical mapping table 231 may include a logical region 310 and a physical region 320.

In an embodiment, logical addresses 311 to 317 may be stored in the logical region 310. In an embodiment, physical addresses 323 and 327 or data patterns 321 and 325 mapped to (or corresponding to) the logical addresses 311 to 317 may be stored in the physical region 320.

In an embodiment, flags 331 to 337 distinguishing whether data stored in the physical region 320 are the physical addresses 323 and 327 or are the data patterns 321 and 325 may be stored in the logical to physical mapping table 231. In an embodiment, the flags 331 to 337 may be stored in a region 330 of the logical to physical mapping table 231 other than the logical region 310 and the physical region 320. In an embodiment, the flags 331 to 337 may be additionally stored in the logical to physical mapping table 231 which includes the logical region 310 and the physical region 320.

In various embodiments, the flags 331 to 337 may be stored in a region other than the logical to physical mapping table 231 (or a region independent from the logical to physical mapping table 231) (e.g., the data region 233) within the first memory 230.

In an embodiment, in response to the data patterns 321 and 325 being stored in the physical region 320, values of the flags 331 and 335 may be configured with '1' and, in response to the physical addresses 323 and 327 being stored in the physical region 320, values of the flags 333 and 337 may be configured with '0'. However, an embodiment is not limited to this, and in response to the data patterns 321 and 325 being stored in the physical region 320, the values of the flags are configured with '0' and, in response to the physical addresses 323 and 327 being stored in the physical region 320, the values of the flags may be configured with '1' as well.

Returning to FIG. 2, in an embodiment, the data region 233 may be a region for storing data. For example, the data region 233 may store data by the unit of page.

In an embodiment, the second memory 240 (e.g., the volatile memory 132) may be a memory for loading (or carrying or storing) at least part of the logical to physical mapping table 231 or part of data stored in the data region 233. In an embodiment, the second memory 240 may be a memory for temporarily storing at least part of the logical to physical mapping table 231 or part of data stored in the data region 233. In an embodiment, the second memory 240 may be a memory for caching at least part of the logical to physical mapping table 231 or part of data stored in the data region 233. In an embodiment, the second memory 240 may be a volatile memory (e.g., a static random access memory (SRAM)). In an embodiment, the second memory 240 may be called an internal memory, etc. In an embodiment, the second memory 240 may store an application (e.g., firmware) related with an operation of the block device 220.

In an embodiment, the controller 250 may control an operation in which the block device 220 processes data. In an embodiment, the controller 250 may include a micro controller unit (MCU).

In an embodiment, the controller 250 may perform a write operation for storing data.

In an embodiment, the controller 250 may receive (or may receive a delivery of) a request for writing data in the first memory 230 from the host device 210. Below, data requested for write from the host device 210 is called 'first data'.

In an embodiment, a request for writing the first data may include a write command, the first data, and information related with a logical address of the first data. In an embodiment, the information related with the logical address of the first data may include information on a start location (or offset) of the logical address related with the first data and an amplitude of the first data (or a length of the first data).

In an embodiment, the controller 250 may determine whether the first data is pattern data.

In an embodiment, to determine whether the first data is the pattern data (or corresponds to the pattern data), the controller 250 may identify a bit count capable of becoming a bit unit of a data pattern (or a bit count of the data pattern). In an embodiment, the controller 250 may determine a bit count being less than a bit count of the physical region 320 (or an amplitude of the physical region 320) and corresponding to a divisor of a bit count of a page (or an amplitude of the page), as the bit count capable of becoming the bit unit of the data pattern. For example, in response to the bit count of the physical region 320 being 8 and the page having a 16-bit amplitude, the controller 250 may determine 1, 2, and 4 as the bit count capable of becoming the bit unit of the data pattern. In an embodiment, the controller 250 may identify a first bit count corresponding to the least divisor of the amplitude of the page among the bit counts capable of becoming the bit unit of the data pattern. For example, the controller 250 may identify a bit count 1 corresponding to the least divisor of 16 among bit counts 1, 2, and 4 capable of becoming the bit unit of the data pattern. In an embodiment, the controller 250 may identify a bit value of the first bit count among the first data. For example, in response to the first data being a binary number 1001100110011001 and the first bit count being 1, the controller 250 may identify a bit value '1' of one more significant bit in 1001100110011001. In an embodiment, the controller 250 may provide comparison data by repeating the bit value of the first bit count among the first data as much as an amplitude of the first data (or the amplitude of the page). For example, the controller 250 may provide '1111111111111111' as first comparison data by repeating a bit value '1' of one more significant bit in 1001100110011001 as much as the amplitude of the first data (or the amplitude of the page). In an embodiment, the controller 250 may compare the first data and the provided first comparison data and, in response to identifying that the first data and the first comparison data are identical, the controller 250 may determine the first data as the pattern data. In an embodiment, in response to identifying that the first data and the first comparison data are not identical, the controller 250 may identify a second bit count corresponding to a secondly less divisor among the bit counts capable of becoming the bit unit of the data pattern. For example, the controller 250 may identify that first data 1001100110011001 and 1111111111111111 are not identical. The controller 250 may identify 2 among the bit counts 1, 2, and 4 capable of becoming the bit unit of the data pattern, as the second bit count. In an embodiment, the controller 250 may identify a bit value of the second bit count among the first data. For example, in response to the first data being a binary number 1001100110011001 and the second bit count being 2, the controller 250 may identify a bit value '10' of two more significant bits in 1001100110011001. In an embodiment, the controller 250 may provide comparison data by repeating a bit value of the second bit count among the first data as much as the amplitude of the first data (or the amplitude of the page). For example, the controller 250 may provide '1010101010101010' as second comparison data by repeating a bit value '10' of two more significant bits in 1001100110011001 as much as the amplitude of the first data (or the amplitude of the page). In an embodiment, in response to identifying that the first data and the provided second comparison data are not identical, the controller 250 may identify a third bit count corresponding to a thirdly less divisor among the bit counts capable of becoming the bit unit of the data pattern. For example, the controller 250 may identify that the first data 1001100110011001 and the second comparison data 1111111111111111 are not identical. The controller 250 may identify 4 among the bit counts 1, 2, and 4 capable of becoming the bit unit of the data pattern, as a third bit count. In an embodiment, the controller 250 may identify a bit value of the third bit count among the first data. For example, in response to the first data being a binary number 1001100110011001 and the third bit count being 4, the controller 250 may identify a bit value '100' of four more significant bits in 1001100110011001. In an embodiment, the controller 250 may provide comparison data by repeating a bit value of the third bit count among the first data as much as the amplitude of the first data (or the amplitude of the page). For example, the controller 250 may provide '1001100110011001' as third comparison data by repeating a bit value '1001' of four more significant bits in 1001100110011001 as much as the amplitude of the first data (or the amplitude of the page). In an embodiment, the controller 250 may identify that the first data 1001100110011001 and the provided third comparison data 1001100110011001 are identical, and determine that the first data is the pattern data.

The above-described embodiments describe examples of determining whether the first data is the pattern data, on the basis of a sequence going from the bit count (e.g., the first bit count (or the bit count 1)) corresponding to the least divisor of the amplitude of the page among the bit counts capable of becoming the bit unit of the data pattern, to the bit count (e.g., the third bit count (or the bit count 4)) corresponding to the largest divisor, but an embodiment is not limited to this. For example, the controller 250 may determine whether the first data is the pattern data, on the basis of a sequence going from the bit count corresponding to the largest divisor of the amplitude of the page among the bit counts capable of becoming the bit unit of the data pattern, to the bit count corresponding to the least divisor.

In an embodiment, in response to identifying that each (or all) of the comparison data provided using the bit count (e.g., one bit) corresponding to the least divisor of the amplitude of the page among the bit counts capable of becoming the bit unit of the data pattern to the bit count corresponding to the largest divisor less than the bit count of the physical region 320 among divisors of a bit count of the page does not match with the first data, the controller 250 may determine that the first data is not the pattern data (or does not correspond to the pattern data). However, an embodiment is not limited to this, and the controller 250 may determine whether the first data corresponds to the pattern data by performing an operation of comparing the comparison data and the first data on the basis of a specified number of times. For example, in response to the specified number of times being one, the controller 250 may provide the comparison data by using a bit count corresponding to the least divisor (e.g., the first bit count) (or the largest divisor) of the amplitude of the page among the bit counts capable of becoming the bit unit of the data pattern, and in response to identifying that the provided comparison data and the first data do not match, the controller 250 may determine that the first data is not the pattern data. In another example, the controller 250 may provide the comparison data by using the bit count corresponding to the least divisor (e.g., the first bit count (or the bit count 1)) of the amplitude of the page among the bit counts capable of becoming the bit unit of the data pattern and a divisor (e.g., the second bit count (or the bit count 2)) having an amplitude next to that of the least divisor, and in response to identifying that each of the provided comparison data does not match with the first data, the controller 250 may determine that the first data is not the pattern data.

In an embodiment, an operation of determining whether the first data is the pattern data may be performed through independent hardware. In another embodiment, the operation of determining whether the first data is the pattern data may be performed by software included in the block device 220.

In an embodiment, the amplitude of the first data may be a unit data transmission from the host device 210 to the block device 220. For example, the amplitude of the first data may be a maximum transmission of data which may be transmitted through one transmission operation from the host device 210 to the block device 220. In an embodiment, the amplitude of the first data may be variable according to the kind of an interface of the host device 210 and the block device 220, etc.

In an embodiment, the amplitude of the first data and the amplitude of the page as a unit for storing data in the first memory 230 may be identical or be different.

In an embodiment, in response to the amplitude of the write-requested first data being greater than the amplitude of the page as a unit for storing data in the first memory 230, the controller 250 may split the first data as much as the amplitude of the page and determine whether each of a first data portion is the pattern data. For example, in response to the amplitude of the write-requested first data being 512 Kbytes and the amplitude of the page being 256 Kbytes, the controller 250 may split the first data into a first portion having an amplitude of 256 Kbytes and a second portion having an amplitude of 256 Kbytes, and determine whether each of the first portion and the second portion is the pattern data.

In an embodiment, in response to the amplitude of the first data requested for write being less than the amplitude of the page, the controller 250 may determine that the first data does not correspond to the pattern data. In an embodiment, in response to the first data being less than the amplitude of the page, the controller 250 may fail to restore data requested for read on the basis of the data pattern in a read operation to be described later.

In an embodiment, in response to determining that the first data is the pattern data, the controller 250 may map the data pattern with the logical address and store the data pattern in the physical region 320 of the logical to physical mapping table 231. For example, in response to determining that the first data is the pattern data, the controller 250 may map the data pattern with the logical address to correspond to information on the logical address received from the host device 210, and store the data pattern in the physical region 320 of the logical to physical mapping table 231.

In an embodiment, in response to determining that the first data is not the pattern data, the controller 250 may map the logical address received from the host device 210 and the physical address of the first memory 230 in which the first data will be stored, and store the first data in a region (or the data region 233) of the first memory 230 indicated by the mapped physical address.

In an embodiment, the controller 250 may store a value of a flag indicating whether data stored in the physical region 320 is the physical address or is the data pattern, in the physical region 320 of the logical to physical mapping table 231.

In an embodiment, the controller 250 may update (or refine) the logical to physical mapping table 231. For example, the controller 250 may update the existing logical to physical mapping table 231 (or the logical to physical mapping table 231 before a write request for first data is received), into the logical to physical mapping table 231 which includes a table mapping the logical address and the physical address which indicates a region of the first memory 230 in which the data pattern of the first data or the first data has been stored.

In an embodiment, the controller 250 may perform a read operation for delivering data to the host device 210. In an embodiment, the controller 250 may receive (or may receive a delivery of) a request for reading data from the host device 210. Below, data requested for read from the host device 210 is called 'second data'.

In an embodiment, a request for writing second data may include a read command and information related with a logical address of the second data. In an embodiment, the information related with the logical address of the second data may include information on a start location (or offset) of the logical address related with the second data and an amplitude of the second data (or a length of the second data).

In an embodiment, the controller 250 may load part of the logical to physical mapping table 231 related with the second data from the first memory 230 to the second memory 240.

In an embodiment, in response to a read request for the second data being received from the host device 210, the controller 250 may identify whether part of the logical to physical mapping table 231 including the logical address related with the second data has been loaded to the second memory 240.

In an embodiment, in response to identifying that part of the logical to physical mapping table 231 including the logical address related with the second data has not been loaded to the second memory 240, the controller 250 may perform an operation of loading part of the logical to physical mapping table 231 including the logical address related with the second data from the first memory 230 to the second memory 240. For example, until part of the logical to physical mapping table 231 including the logical address related with the second data is loaded to the second memory 240, the controller 250 may perform an operation of loading part of the logical to physical mapping table 231 to the second memory 240.

In an embodiment, the controller 250 may determine whether the second data is the pattern data.

In an embodiment, the controller 250 may determine whether the second data is the pattern data, on the basis of values of flags 331 to 337 of the logical to physical mapping table 231. For example, in response to identifying that a bit value of a flag corresponding to a logical address related with the second data is '1', the controller 250 may determine that the second data is the pattern data. In another example, in response to identifying that the bit value of the flag corresponding to the logical to physical mapping table 231 mapped to the logical address related with the second data is '0', the controller 250 may determine that the second data is not the pattern data.

In an embodiment, in response to determining that the second data is the pattern data, the controller 250 may obtain the data pattern from the logical to physical mapping table 231. For example, in response to determining that the second data is the pattern data, the controller 250 may identify the data pattern stored in the physical region 320 of the logical to physical mapping table 231.

In an embodiment, in response to identifying the data pattern stored in the physical region 320 of the logical to physical mapping table 231, the controller 250 may restore the second data on the basis of the data pattern. In an embodiment, the controller 250 may restore the second data by continuously repeating the data pattern to be the same amplitude as an amplitude of a page. In an embodiment, the controller 250 may restore the second data by repeating the data pattern as much as a number dividing the amplitude of the page by a bit unit of the data pattern. For example, in response to the controller 250 identifying the data pattern as a bit value '1001' of 4 bits and the amplitude of the page being 16 bits, the controller 250 may restore 1001100110011001 as the second data by repeating the data pattern 1001 four times.

In an embodiment, in response to determining that the second data is not the pattern data, the controller 250 may obtain the second data on the basis of the physical address stored in the physical region 320 of the logical to physical mapping table 231. For example, the controller 250 may identify data stored in a location of the first memory 230 indicated by the physical address mapped to the logical address related with the second data, as the second data.

In an embodiment, in response to obtaining the second data, the controller 250 may transmit the obtained second data to the host device 210.

Figure 4:
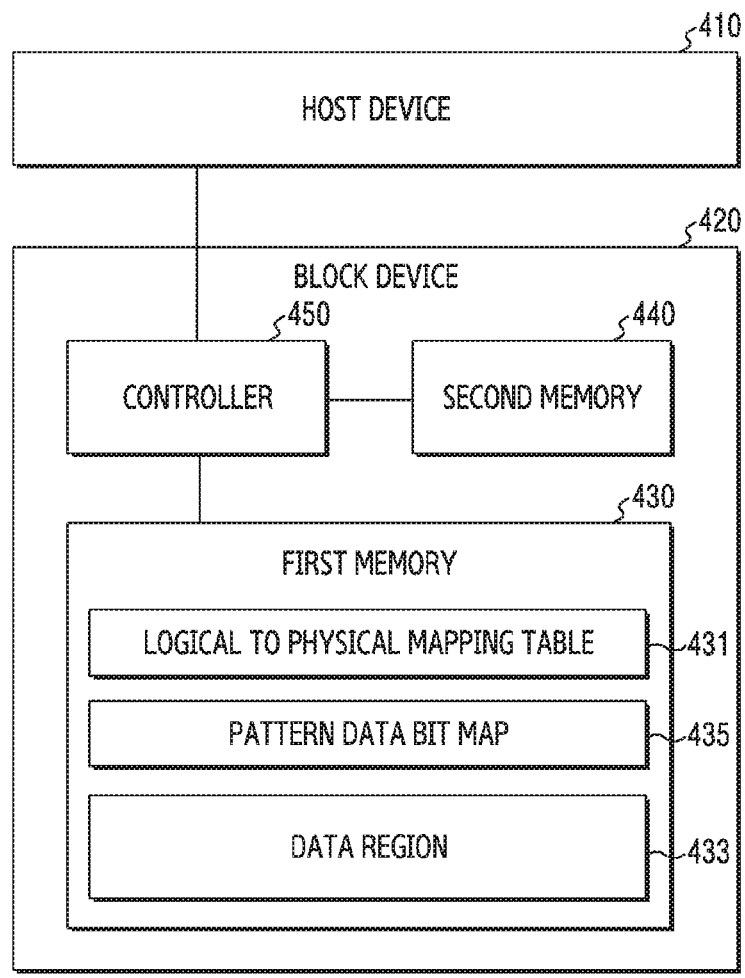
FIG. 4 is a diagram illustrating an electronic device for processing data, according to various embodiments of the present disclosure.

FIG. 4 is a diagram illustrating the electronic device 101 for processing data, according to various embodiments of the present disclosure.

Referring to FIG. 4, in an embodiment, the electronic device 101 may include a host device 410 and a block device 420. In an embodiment, the host device 410 may include at least part of the processor 120 of FIG. 1. In an embodiment, the host device 401 may be the main processor 121 (e.g., a central processing device or an application processor).

In an embodiment, the host device 410 may deliver a request for processing data to the block device 420. A detailed description related with the host device 410 is duplicated with a description of the host device 210 of FIG. 2 and thus, a detailed description is omitted.

In an embodiment, the block device 420 (or storage) may include at least part of the memory 130 of FIG. 1. For example, the block device 420 may include at least part of the volatile memory 132 and the non-volatile memory 134.

In an embodiment, the block device 420 may include a first memory 430, a second memory 440, and a controller 450. In an embodiment, the block device 420 may include a package device capable of including the controller 450 and storing data.

In an embodiment, the first memory 430 may include a logical to physical mapping table 431, a data region 433 (or space), and a pattern data bit map 435.

In an embodiment, the logical to physical mapping table 431 may store (or write, or record, or register) after mapping a logical address and a physical address or a repeated bit value of data configured in a form of repeating a specified number of bit values.

In an embodiment, unlike the logical to physical mapping table 231 of FIG. 2, the logical to physical mapping table 431 of FIG. 4 may not store the values 331 to 337 of the flags indicating whether the data stored in the physical region of the logical to physical mapping table 431 is the physical address or is the data pattern.

In an embodiment, the pattern data bit map 435 may include a map (or set) of bit values indicating whether the data stored in the physical region of the logical to physical mapping table 431 is the physical address or is the data pattern.

In an embodiment, the pattern data bit map 435 may include a set of the flag values 331 to 337 stored in the logical to physical mapping table 231 of FIG. 2 separate (or independent) from the logical to physical mapping table 431.

Figure 5:
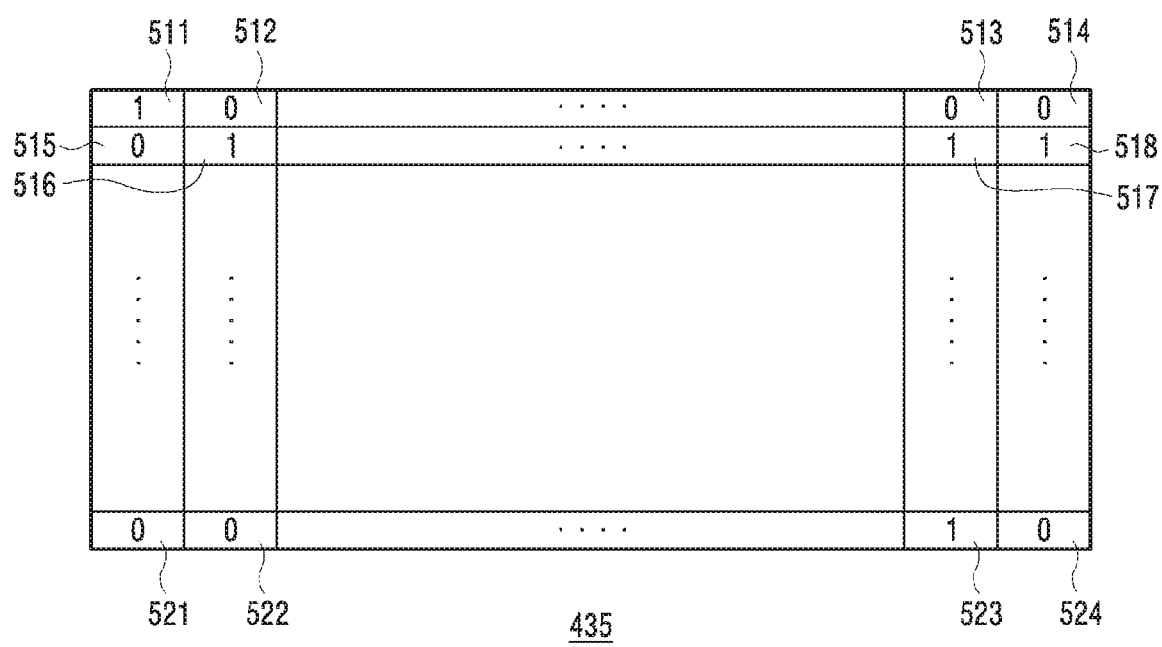
FIG. 5 is a diagram illustrating a pattern data bit map, according to various embodiments of the present disclosure.

FIG. 5 is a diagram illustrating the pattern data bit map 435, according to various embodiments of the present disclosure.

Referring to FIG. 5, in an embodiment, the pattern data bit map 435 may be configured with a bit value '1' indicating that first data is pattern data or a bit value '0' indicating that the first data is not the pattern data.

In an embodiment, bits (or bit values) 511 to 524 of the pattern data bit map 435 may correspond to logical addresses related with data. For example, the bit value 511 (or a location of the bit) may correspond to a logical address of the first data.

In an embodiment, a total number of bits included in the pattern data bit map 435 may correspond to the number of pages. For example, in response to a data storage capacity of the first memory 430 being 256 Gbytes and an amplitude of a page being 4 Kbytes, an amplitude of the pattern data bit map 435 may be 64 Mbytes.

Returning to FIG. 4, in an embodiment, the data region 433 may be a region for storing data.

In an embodiment, the second memory 440 may be a memory for loading (or carrying or storing) at least part of the logical to physical mapping table 431 or part of data stored in the data region 433. In an embodiment, the second memory 440 may be a memory for temporarily storing at least part of the logical to physical mapping table 431 or part of the data stored in the data region 433.

In an embodiment, the controller 450 may control an operation in which the block device 420 processes data. In an embodiment, the controller 450 may include a micro controller unit (MCU).

In an embodiment, the controller 450 may perform a write operation for storing data.

In an embodiment, the controller 450 may receive (or may receive a delivery of) a request for writing the first data in the first memory 430 from the host device 410.

In an embodiment, the request for writing the first data may include a write command, the first data, and information related with the logical address of the first data.

In an embodiment, the controller 450 may determine whether the first data is the pattern data. In an embodiment, an operation in which the controller 450 determines whether the first data is the pattern data is at least partly identical or similar with an operation in which the controller 250 of FIG. 2 determines whether the first data is the pattern data and thus, a detailed description is omitted.

In an embodiment, in response to determining that the first data is the pattern data, the controller 450 may map the data pattern with the logical address and store the data pattern in a physical region of the logical to physical mapping table 431. In an embodiment, in response to determining that the first data is not the pattern data, the controller 450 may map the logical address received from the host device 410 and the physical address of the first memory 230 in which the first data will be stored, and store the first data in a region (or the data region 433) of the first memory 430 indicated by the mapped physical address.

In an embodiment, the controller 450 may store the bit values 511 to 524 indicating whether the data stored in the physical region of the logical to physical mapping table 431 is the physical address or is the data pattern, in the pattern data bit map 435.

In an embodiment, the controller 450 may update (or refine) the pattern data bit map 435 (or the pattern data bit map 435 before a write request for the first data is received). For example, the controller 450 may update the existing pattern data bit map 435 to reflect a flag value indicating whether the first data received from the host device 410 corresponds to the pattern data.

In an embodiment, the controller 25 may update (or refine) the logical to physical mapping table 431. For example, the controller 450 may update the existing logical to physical mapping table 431 (or the logical to physical mapping table 431 before a write request for first data is received), into the logical to physical mapping table 431 which includes a table mapping the logical address and the physical address which indicates the region (or the data region 433) of the first memory 230 in which the data pattern of the first data or the first data has been stored.

In an embodiment, the controller 450 may perform a read operation for delivering data to the host device 410. In an embodiment, the controller 450 may receive (or may receive a delivery of) a request for reading data from the host device 410.

In an embodiment, a request for writing second data may include a read command and information related with a logical address of the second data. In an embodiment, the information related with the logical address of the second data may include information on a start location (or offset) of the logical address related with the second data and an amplitude of the second data (or a length of the second data).

In an embodiment, the controller 450 may load part of the logical to physical mapping table 430 related with the second data and at least part of the pattern data bit map 435, from the first memory 430 to the second memory 440.

In an embodiment, in response to the read request for the second data being received from the host device 410, the controller 450 may identify whether part of the logical to physical mapping table 431 including the logical address related with the second data and at least part of the pattern data bit map 435 have been loaded to the second memory 440.

In an embodiment, in response to identifying that part of the logical to physical mapping table 431 including the logical address related with the second data or at least part of the pattern data bit map 435 have not been loaded to the second memory 440, the controller 450 may perform an operation of loading part of the logical to physical mapping table 431 including the logical address related with the second data or at least part of the pattern data bit map 435, from the first memory 430 to the second memory 440. For example, until part of the logical to physical mapping table 431 including the logical address related with the second data and at least part of the pattern data bit map 435 are loaded to the second memory 440, the controller 450 may perform an operation of loading part of the logical to physical mapping table 431 and at least part of the pattern data bit map 435 to the second memory 440.

In an embodiment, the controller 450 may determine whether the second data is the pattern data.

In an embodiment, the controller 450 may determine whether the second data is the pattern data, on the basis of a value of a flag of the pattern data bit map 435. For example, the controller 450 may identify a location of the pattern data bit map 435 corresponding to the logical address related with the second data. The controller 450 may determine whether the second data is the pattern data, according to a value of a flag which is in the identified location of the pattern data bit map 435. For example, in response to the value of the flag which is in the identified location of the pattern data bit map 435 being '1', the controller 450 may determine that the second data is the pattern data, and in response to the value of the flag which is in the identified location of the pattern data bit map 435 being '0', the controller 450 may determine that the second data is not the pattern data.

In an embodiment, in response to determining that the second data is the pattern data, the controller 450 may obtain the data pattern from the logical to physical mapping table 431. For example, in response to determining that the second data is the pattern data, the controller 450 may identify the data pattern stored in a physical region of the logical to physical mapping table 431.

In an embodiment, in response to identifying the data pattern stored in the physical region of the logical to physical mapping table 431, the controller 450 may restore the second data on the basis of the data pattern. In an embodiment, the controller 450 may restore the second data by continuously repeating the data pattern to have the same amplitude as an amplitude of a page. In an embodiment, the controller 450 may restore the second data by repeating the data pattern as much as a number dividing the amplitude of the page by a bit unit of the data pattern.

In an embodiment, in response to determining that the second data is not the pattern data, the controller 450 may obtain the second data on the basis of a physical address stored in a physical region of the logical to physical mapping table 431. For example, the controller 450 may identify data stored in a location of the first memory 430 indicated by the physical address mapped to the logical address related with the second data, as the second data.

In an embodiment, in response to obtaining the second data, the controller 450 may transmit the obtained second data to the host device 410.

An electronic device of various embodiments of the present disclosure may include a host device and a block device electrically connected to the host device. The block device may include a first memory and a controller electrically connected to the first memory. The controller may receive a write request for first data from the host device, and determine whether the first data is pattern data configured in a form of repeating a specified number of bit values, and in response to determining that the first data is the pattern data, control the first memory to map the specified number of bit values of the first data with a logical address indicated by the write request and store the specified number of bit values in a logical to physical mapping table.

In various embodiments, the controller may control the first memory to store the specified number of bit values of the first data in a physical region corresponding to a logical region where the logical address has been stored within the logical to physical mapping table.

In various embodiments, the controller may specify the repeated number of bit values, and identify the specified number of bit values within the first data, and by continuously repeating the identified bit value, providing comparison data having the same amplitude as an amplitude of a page, and identify whether the first data is identical with the comparison data, and in response to it being identified that the first data is identical with the comparison data, determine the first data as the pattern data.

In various embodiments, the specified number may be less than a bit count of the physical region of the logical to physical mapping table and correspond to a divisor of the amplitude of the page.

In various embodiments, in response to an amplitude of the first data being greater than the amplitude of the page, the controller may split the first data by the amplitude of the page and determine whether each of parts of the split first data is the pattern data.

In various embodiments, the controller may store a flag indicating whether the first data corresponds to the pattern data in the logical to physical mapping table.

In various embodiments, the controller may provide a pattern data bit map comprising the flag indicating whether the first data corresponds to the pattern data.

In various embodiments, the electronic device may further comprise a second memory, and the controller may receive a read request for second data from the host device, and load part of the logical to physical mapping table comprising a logical address indicated by the read request, to the second memory.

In various embodiments, the controller may determine whether the second data is the pattern data on the basis of a flag indicating whether the second data corresponds to the pattern data and being stored in the logical to physical mapping table, and in response to determining that the second data is the pattern data, identify a specified number of bit values which configure the pattern data in a form of being stored and repeated in a physical region of the loaded logical to physical mapping table, and by repeating the identified specified number of bit values to have the same amplitude as the amplitude of the page, restore the second data.

In various embodiments, the controller may determine whether the second data is the pattern data on the basis of a pattern data bit map including the flag indicating whether the second data corresponds to the pattern data, and in response to determining that the second data is the pattern data, identify the specified number of bit values which configure the pattern data in a form of being stored and repeated in the physical region of the loaded logical to physical mapping table, and by repeating the identified specified number of bit values to have the same amplitude as the amplitude of the page, restore the second data.

Figure 6:
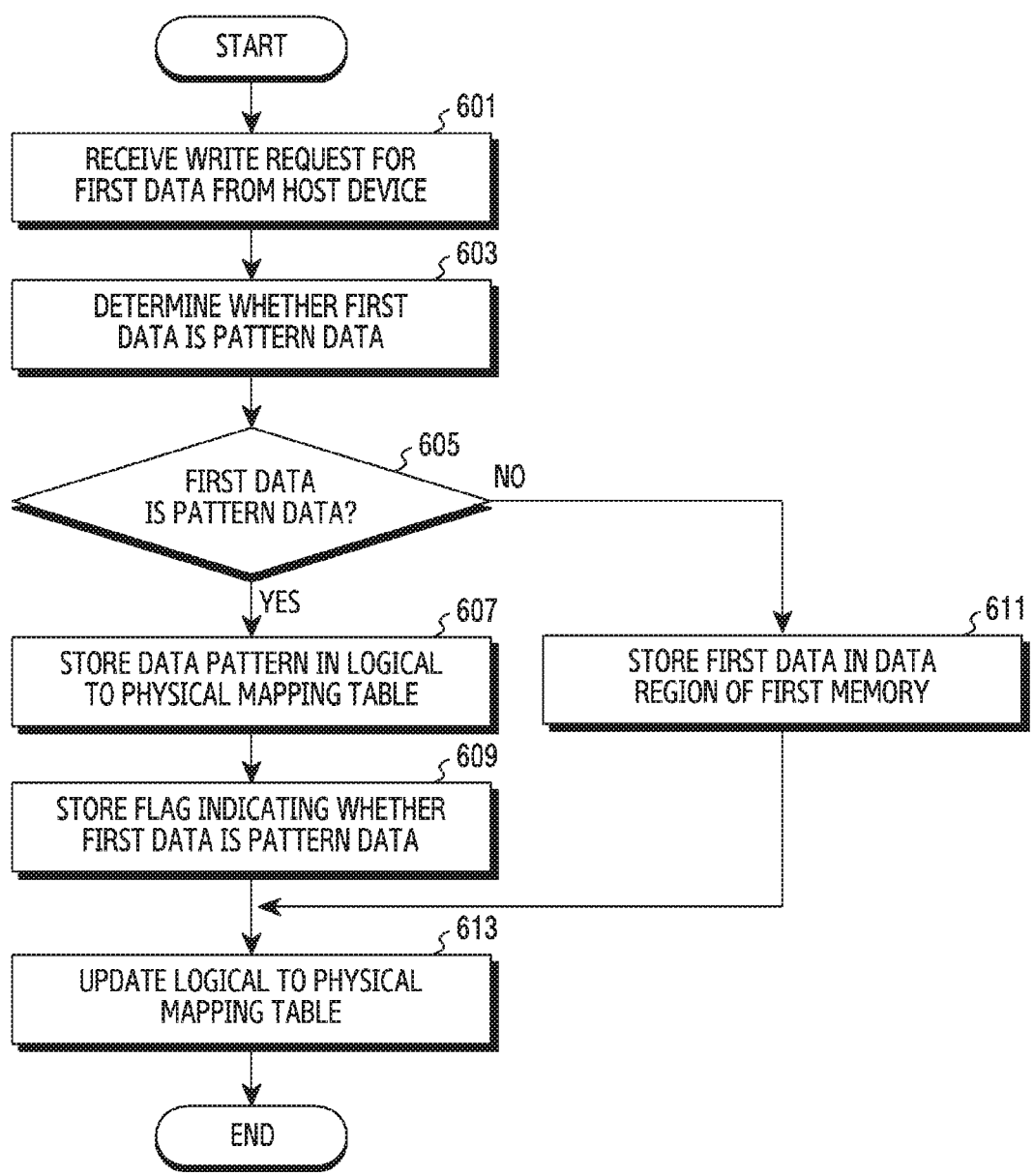
FIG. 6 is a flowchart for explaining a method for writing data in a block device, according to various embodiments of the present disclosure.

FIG. 6 is a flowchart for explaining a method for writing data in the block device 220, according to various embodiments of the present disclosure.

In an embodiment, FIG. 6 may be an operation performed in the electronic device 101 shown in FIG. 2.

Referring to FIG. 6, in an embodiment, in operation 601, the controller 250 may receive a write (or register or record or store) request for first data from the host device 210. For example, the controller 250 may receive a request for writing first data in the first memory 230 from the host device 210.

In an embodiment, the write request for the first data may include a write command, the first data, and information related with a logical address of the first data. In an embodiment, the information related with the logical address of the first data may include information on a start location (or offset) of the logical address related with the first data and an amplitude of the first data (or a length of the first data).

In an embodiment, in operation 603, the controller 250 may determine whether the first data is pattern data. In an embodiment, an operation of determining whether the first data is the pattern data may be performed by hardware (or hardware logic or circuit) controlled by software or the controller 250. For example, an operation of determining whether the first data is the pattern data may be controlled by software or the controller 250 and be performed using a dedicated hardware for an operation of determining whether the first data is the pattern data. The operation in which the controller 250 determines whether the first data is the pattern data will be described in detail with reference to FIG. 7.

Figure 7:
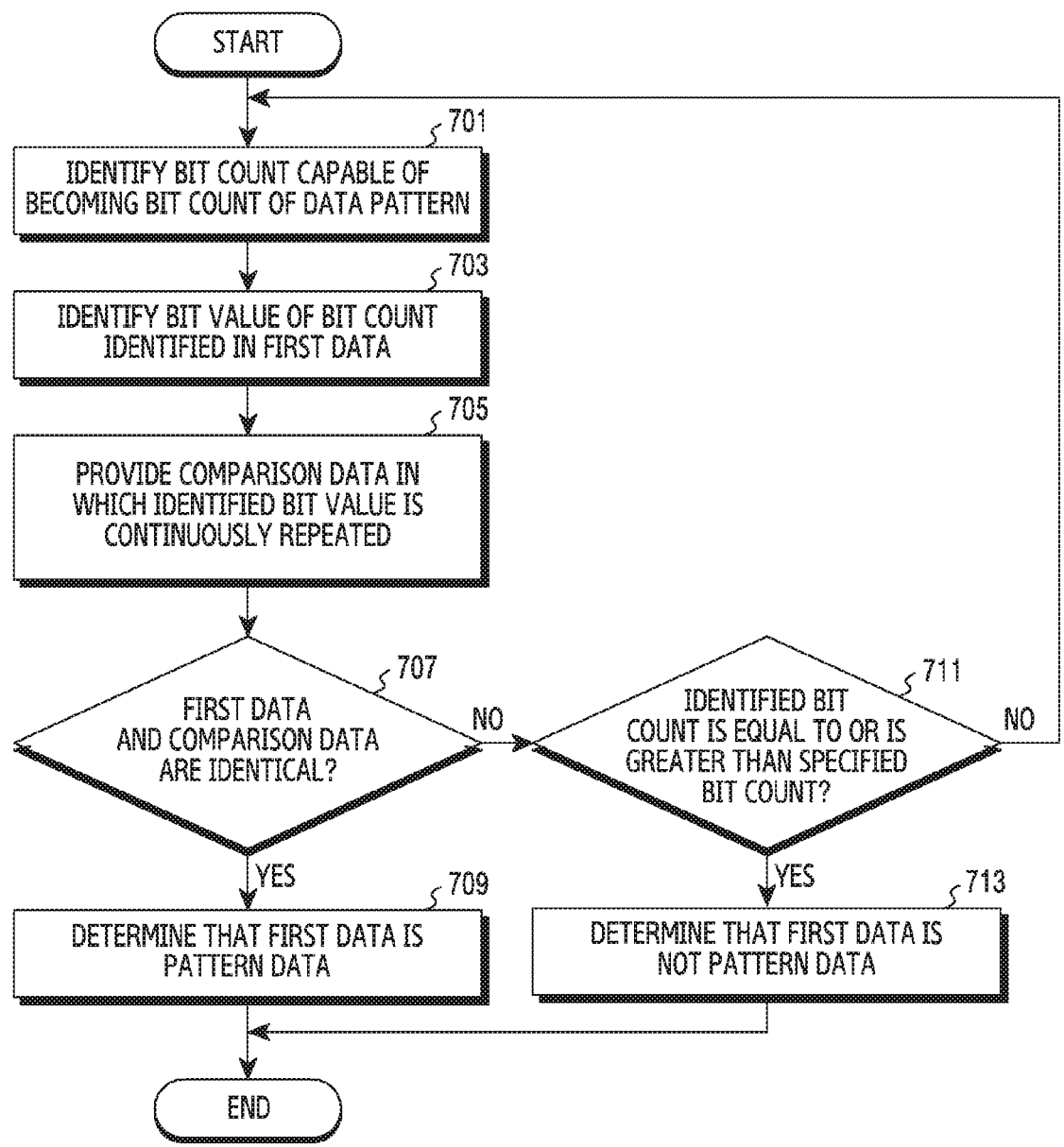
FIG. 7 is a flowchart for explaining a method for determining whether data requested for write is pattern data, according to various embodiments of the present disclosure.

FIG. 7 is a flowchart for explaining a method for determining whether data requested for write is pattern data, according to various embodiments of the present disclosure.

Referring to FIG. 7, in an embodiment, in operation 701, the controller 250 may identify a bit count capable of becoming a bit unit of a data pattern. In an embodiment, the controller 250 may determine a bit count being less than a bit count of a physical region (or an amplitude of the physical region) and corresponding to a divisor of a bit count of a page (or an amplitude of the page), as a bit count capable of becoming a bit unit of the data pattern. For example, in response to the bit count of the physical region being 8 and the page being 16 bits, the controller 250 may determine 1, 2, and 4 as the bit counts capable of becoming the bit unit of the data pattern.

In an embodiment, the controller 250 may identify a first bit count in which first data corresponds to the least divisor of an amplitude of a page, among the bit counts capable of becoming the bit unit of the data pattern. For example, the controller 250 may identify a bit count 1 corresponding to the least divisor of 16 among the bit counts 1, 2, and 4 capable of becoming the bit unit of the data pattern.

In an embodiment, in operation 703, the controller 250 may identify a bit value of the bit count identified in the first data. For example, the controller 250 may identify a bit value of the first bit count among the first data. For example, in response to the first data being a binary number 1001100110011001 and the first bit count being 1, the controller 250 may identify a bit value '1' of one more significant bit in 1001100110011001.

In an embodiment, in operation 705, the controller 250 may provide comparison data in which the identified bit value is repeated continuously. In an embodiment, the controller 250 may provide the comparison data by repeating the bit value of the first bit count among the first data as much as an amplitude of the first data (or an amplitude of the page). For example, the controller 250 may provide '1111111111111111' as the first comparison data by repeating the bit value '1' of one more significant bit in 100100110011001 to be the same amplitude as the amplitude of the first data (or the amplitude of the page).

In an embodiment, in operation 707, the controller 250 may determine whether the first data and the provided comparison data are identical. For example, the controller 250 may identify that the first data and the first comparison data are identical.

In an embodiment, in operation 709, in response to the controller 250 identifying that the first data and the provided comparison data are identical in operation 707, the controller 250 may determine that the first data is the pattern data.

In an embodiment, in operation 711, in response to the controller 250 identifying that the first data and the provided comparison data are not identical in operation 707, the controller 250 may determine whether the bit count identified in operation 701 is equal to or is greater than a specified bit count. For example, the controller 250 may identify whether the identified bit count is equal to or is greater than one bit count which is specified as the first bit count.

In an embodiment, the specified bit count may be the largest number which is less than a bit count of a physical region among a divisor of a bit count of a page. For example, in response to the bit count of the physical region being 8 and the page being configured with 16 bits, the specified bit count may be 4 less than 8 among divisors of 16.

In an embodiment, in response to the controller 250 identifying that a bit count identified in operation 701 is equal to or is greater than a specified bit count in operation 711, in operation 713, the controller 250 may determine that the first data is not pattern data.

In an embodiment, in response to identifying that the bit count identified in operation 701 is less than the specified bit count in operation 711, the controller 250 may return to operation 701 and in operation 701, the controller 250 may identify a second bit count in which the first data corresponds to a secondly less divisor among the bit counts capable of becoming the bit unit of the data pattern.

In an embodiment, the controller 250 may determine whether the first data corresponds to the pattern data by repeating at least some operations of FIG. 7.

For example, in response to the controller 250 identifying that the provided second comparison data and the first data are identical by performing operation 703 to operation 707 by using the second bit count identified in operation 701, in operation 709, the controller may determine that the first data is the pattern data. In response to identifying that the second comparison data and the first data are not identical, the controller may perform operation 711, and in response to identifying that the second bit count is less than the specified bit count as a result of operation 711, the controller may return to operation 701, and in operation 701, the controller 250 may identify a third bit count in which the first data corresponds to a thirdly less divisor among the bit counts capable of becoming the bit unit of the data pattern. In response to the controller 250 identifying that the provided third comparison data and the first data are identical by performing operation 703 to operation 707 by using the third bit count identified in operation 701, in operation 709, the controller may determine that the first data is the pattern data. In response to identifying that the third comparison data and the first data are not identical, the controller may perform operation 711, and in response to identifying that the third bit count is equal to or is greater than the specified bit count as a result of operation 711, in operation 713, the controller 250 may determine that the first data is not the pattern data.

Though not illustrated in FIG. 7, in an embodiment, the controller 250 may determine whether the first data corresponds to the pattern data, by performing an operation of comparing the comparison data and the first data on the basis of a specified number of times. For example, in response to the specified number of times being one, the controller 250 may provide the comparison data by using a bit count corresponding to the least divisor (e.g., a first bit count) (or the largest divisor) of an amplitude of a page among the bit counts capable of becoming the bit unit of the data pattern, and in response to identifying that the provided comparison data and the first data do not match, the controller 250 may determine that the first data is not the pattern data. In another example, the controller 250 may provide the comparison data by using the bit counts corresponding to the least divisor (e.g., the first bit count (or a bit count 1)) of the amplitude of the page among the bit counts capable of becoming the bit unit of the data pattern and a divisor (e.g., a second bit count (or a bit count 2)) having an amplitude next to the least divisor, and in response to identifying that each of the provided comparison data does not match with the first data, the controller 250 may determine that the first data is not the pattern data.

FIG. 7 explains examples of determining whether first data is pattern data, on the basis of a sequence going from a bit count (e.g., a first bit count (or a bit count 1)) corresponding to the least divisor of an amplitude of a page among bit counts capable of becoming a bit unit of a data pattern, to a bit count (e.g., a third bit count (or a bit count 4)) corresponding to the largest divisor, but an embodiment is not limited to this. For example, the controller 250 may determine whether the first data is the pattern data, on the basis of a sequence going from the bit count corresponding to the largest divisor of the amplitude of the page among the bit counts capable of becoming the bit unit of the data pattern, to the bit count corresponding to the least divisor.

Returning to operation 603 of FIG. 6, in an embodiment, the amplitude of the first data may be a unit data transmission from the host device 210 to the block device 220. For example, the amplitude of the first data may be a maximum transmission of data capable of being transmitted from the host device 210 to the block device 220 by one transmission operation. In an embodiment, the amplitude of the first data may be variable according to the kind of an interface of the host device 210 and the block device 220, etc.

In an embodiment, the amplitude of the first data and the amplitude of the page as a unit for storing data in the first memory 230 may be identical or be different.

In an embodiment, in response to an amplitude of the first data requested for write being greater than the amplitude of the page as a unit for storing data in the first memory 230, the controller 250 may split the first data as much as the amplitude of the page and determine whether each of the split first data portions is the pattern data. For example, in response to the amplitude of the first data requested for write being 512 Kbytes and the amplitude of the page being 256 Kbytes, the controller 250 may split the first data into a first portion having an amplitude of 256 Kbytes and a second portion having an amplitude of 256 Kbytes, and determine whether each of the first portion and the second portion is the pattern data.

In an embodiment, in response to the amplitude of the first data requested for write being less than the amplitude of the page, the controller 250 may determine that the first data does not correspond to the pattern data.

In an embodiment, in response to the controller 250 determining that the first data is the pattern data in operation 605, in operation 607, the controller 250 may store a data pattern of the first data (or the pattern data) in the logical to physical mapping table 231. For example, the controller 250 may map the data pattern with a logical address and store the data pattern in a physical region of the logical to physical mapping table 231. For example, in response to determining that the first data is the pattern data, the controller 250 may map the data pattern with the logical address to correspond to information on the logical address received from the host device 210, and store the data pattern in the physical region of the logical to physical mapping table 231.

In an embodiment, in operation 609, the controller 250 may store a value of a flag which indicates whether data stored in a physical region is a physical address or is a data pattern. In an embodiment, the controller 250 may store the value of the flag indicating whether the data stored in the physical region is the physical address or is the data pattern, in the logical to physical mapping table 231. In an embodiment, the controller 250 may store the value of the flag indicating whether the data stored in the physical region is the physical address or is the data pattern, in the region 330 of the logical to physical mapping table 231 other than the logical region 310 and the physical region 320. In an embodiment, the controller 250 may additionally (allocate a bit (or a bit region) and) store the value of the flag indicating whether the data stored in the physical region is the physical address or is the data pattern, in the logical to physical mapping table 231 including the logical region 310 and the physical region 320. In an embodiment, the controller 250 may store the value of the flag indicating whether the data stored in the physical region is the physical address or is the data pattern, in a region (or a region independent from the logical to physical mapping table 231) (e.g., the data region 233) other than the logical to physical mapping table 231 within the first memory 230.

In an embodiment, FIG. 6 illustrates that operation 607 precedes operation 609, but an embodiment is not limited to this, and operation 609 may be performed ahead of operation 607.

In an embodiment, in response to the controller 250 determining that the first data is not the pattern data in operation 605, the controller 250 may map a logical address received from the host device 210 and a physical address of the first memory 230 in which the first data will be stored, and store the first data in a region of the first memory 230 indicated by the mapped physical address.

In an embodiment, in operation 613, the controller 25 may update (or refine) the logical to physical mapping table 231. For example, the controller 250 may update the existing logical to physical mapping table 231 (or the logical to physical mapping table 231 before a write request for first data is received), into the logical to physical mapping table 231 which includes a table mapping the logical address and the physical address which indicates a region of the first memory 230 in which the data pattern of the first data or the first data has been stored.

In an embodiment, at least one operation among operation 603 to operation 613 may be performed by hardware (or a hardware logic or circuit) (or a dedicated hardware) controlled by software or the controller 250.

Figure 8:
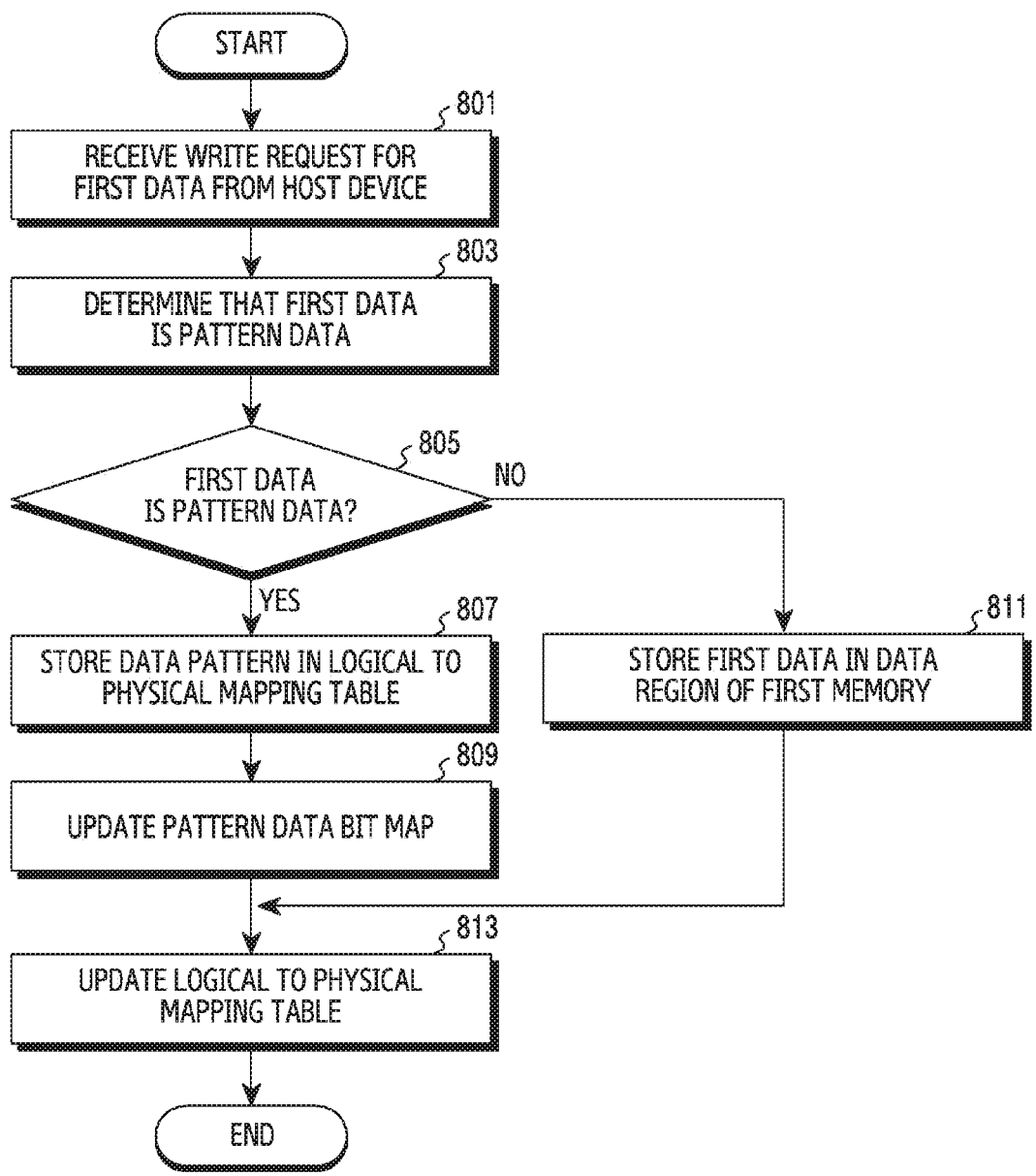
FIG. 8 is a flowchart for explaining a method for writing data in a block device, according to various embodiments of the present disclosure.

FIG. 8 is a flowchart for explaining a method for writing data in the block device 420, according to various embodiments of the present disclosure.

In an embodiment, FIG. 8 may be an operation performed in the electronic device 101 shown in FIG. 4.

Referring to FIG. 8, in an embodiment, in operation 801, the controller 450 may receive a write (or register, or record, or store) request for first data from the host device 410.

In an embodiment, in operation 803, the controller 450 may determine whether the first data is pattern data. In an embodiment, an operation of determining whether the first data is the pattern data may be performed by hardware (or hardware logic or circuit) controlled by software or the controller 450. For example, an operation of determining whether the first data is the pattern data may be controlled by software or the controller 450 and be performed using a dedicated hardware for an operation of determining whether the first data is the pattern data.

In an embodiment, operation 801 and operation 803 of FIG. 8 are at least in part identical or similar with operation 601 and operation 603 of FIG. 6 and thus, a detailed description is omitted.

In an embodiment, in response to the controller 450 determining that the first data is the pattern data in operation 805, in operation 807, the controller 450 may store a data pattern of the first data (or the pattern data) in the logical to physical mapping table 431. For example, the controller 450 may map the data pattern with a logical address and store the data pattern in a physical region of the logical to physical mapping table 431. For example, in response to identifying that the first data is the pattern data, the controller 450 may map the data pattern with the logical address to correspond to information on the logical address received from the host device 410, and store the data pattern in the physical region of the logical to physical mapping table 431. In an embodiment, the logical to physical mapping table 431 of FIG. 8 may not store a value of a flag indicating whether data stored in the physical region is the physical address or is the data pattern, in the physical region.

In an embodiment, in operation 809, the controller 450 may update (or refine) the pattern data bit map 435.

In an embodiment, the pattern data bit map 435 may include a set of flag values which indicates whether the data stored in the physical region of the logical to physical mapping table 431 separate (or independent) from the logical to physical mapping table 431 is the physical address or is the data pattern.

In an embodiment, the controller 450 may update (or refine) the pattern data bit map 435 (or the pattern data bit map 435 before a write request for first data is received). For example, the controller 450 may update the existing pattern data bit map 435 to reflect a flag value which indicates whether the first data received from the host device 410 corresponds to the pattern data.

In an embodiment, in response to the controller 450 determining that the first data is not the pattern data in operation 805, in operation 811, the controller 450 may store the first data in the data region 433 of the first memory 430.

In an embodiment, in operation 813, the controller 450 may update the logical to physical mapping table. For example, the controller 450 may update the existing logical to physical mapping table 431 (or the logical to physical mapping table 431 before the write request for the first data is received), into the logical to physical mapping table 431 which includes a table mapping the logical address and the physical address which indicates a region of the first memory 430 in which the data pattern of the first data or the first data has been stored.

In an embodiment, at least one operation among operation 803 to operation 813 may be performed by hardware (or a hardware logic or circuit) (or a dedicated hardware) controlled by software or the controller 450.

Figure 9:
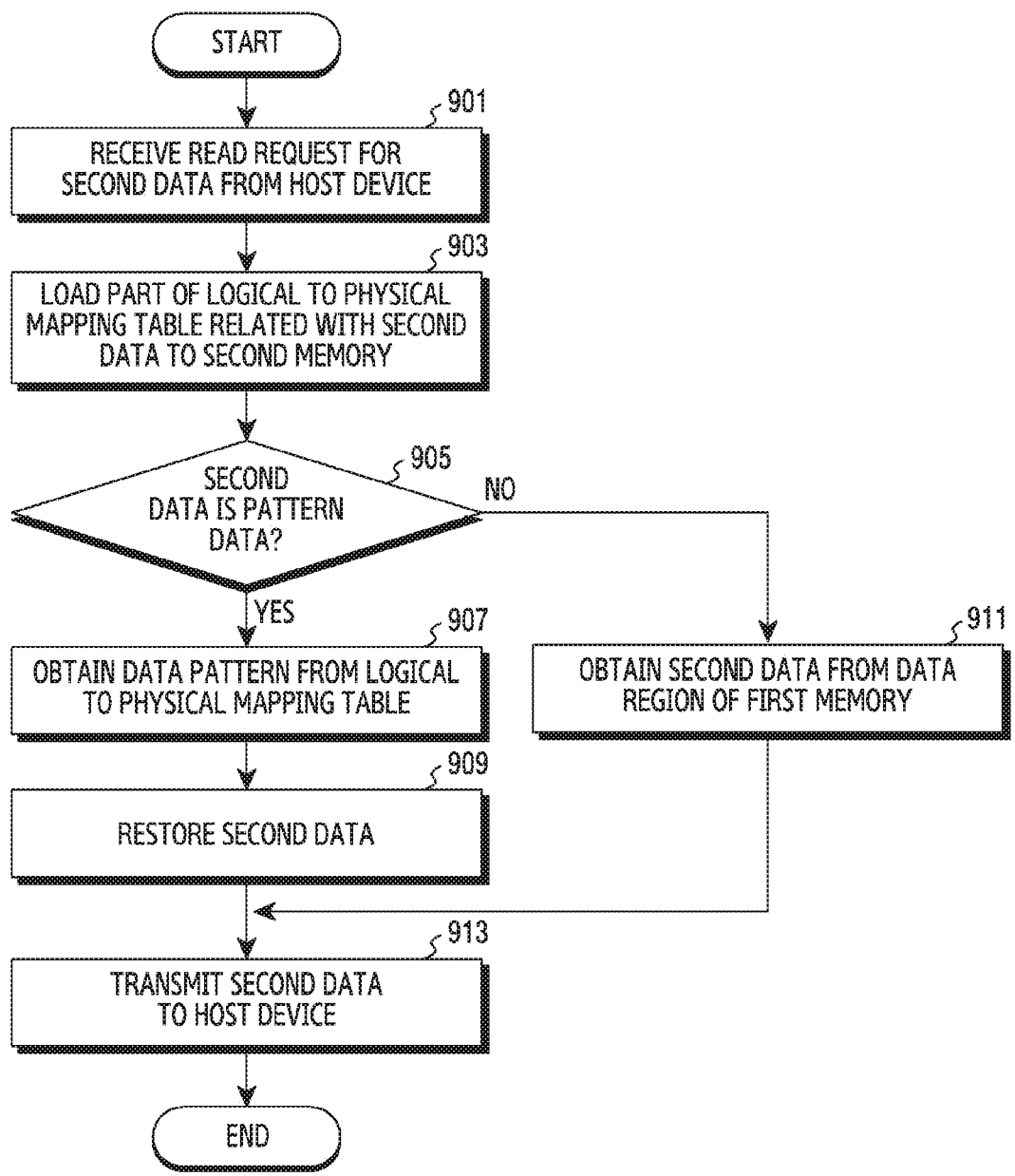
FIG. 9 is a flowchart for explaining a method for reading data from a block device, according to various embodiments of the present disclosure.

FIG. 9 is a flowchart for explaining a method for reading data from the block device 220, according to various embodiments of the present disclosure.

Referring to FIG. 9, in an embodiment, in operation 901, the controller 250, 450 may receive a read request for second data from the host device 210, 410.

In an embodiment, the read request for the second data may include a read command and information related with a logical address of the second data. In an embodiment, the information related with the logical address of the second data may include information on a start location (or offset) of the logical address related with the second data and an amplitude of the second data (or a length of the second data).

In an embodiment, in operation 903, the controller 250, 450 may load part of the logical to physical mapping table 231, 431 related with the second data, to the second memory 240, 440. For example, the controller 250, 450 may load part of the logical to physical mapping table 231, 431 related with the second data, from the first memory 230, 430 to the second memory 240, 440.

In an embodiment, in response to the read request for the second data being received from the host device 210, 410, the controller 250, 450 may identify whether part of the logical to physical mapping table 231, 431 including the logical address related with the second data has been loaded to the second memory 240, 440.

In an embodiment, in response to identifying that part of the logical to physical mapping table 231, 431 including the logical address related with the second data has not been loaded to the second memory 240, 440, the controller 250, 450 may perform an operation of loading part of the logical to physical mapping table 231, 431 including the logical address related with the second data from the first memory 230, 430 to the second memory 240, 440. For example, until part of the logical to physical mapping table 231, 431 including the logical address related with the second data is loaded to the second memory 240, 440, the controller 250, 450 may perform an operation of loading part of the logical to physical mapping table 231, 431 to the second memory 240, 440.

In an embodiment, the controller 250 may load part of the logical to physical mapping table 231 which includes a flag in a physical region of the logical to physical mapping table 231, to the second memory 240. In another embodiment, the controller 450 may load at least part of the pattern data bit map 435, together with part of the logical to physical mapping table 431.

In an embodiment, in operation 905, the controller 250, 450 may determine whether the second data is pattern data.

In an embodiment, the controller 250 may determine whether the second data is the pattern data, on the basis of a value of a flag of the logical to physical mapping table 231. For example, in response to identifying that a bit value of a flag corresponding to the logical address related with the second data is '1', the controller 250 may determine that the second data is the pattern data. In another example, in response to identifying that the bit value of the flag corresponding to the logical address related with the second data is '0', the controller 250 may determine that the second data is not the pattern data.

In another embodiment, the controller 450 may determine whether the second data is the pattern data, on the basis of the value of the flag of the pattern data bit map 435. For example, the controller 450 may identify a location of the pattern data bit map 435 corresponding to the logical address related with the second data. The controller 450 may determine whether the second data is the pattern data, according to a value of a flag which is in the identified location of the pattern data bit map. For example, in response to the value of the flag which is in the identified location of the pattern data bit map 435 being '1', the controller 450 may determine that the second data is the pattern data, and in response to the value of the flag which is in the identified location of the pattern data bit map 435 being '0', the controller 450 may determine that the second data is not the pattern data.

In an embodiment, in response to the controller 250, 450 determining that the second data is the pattern data in operation 905, in operation 907, the controller 250, 450 may obtain a data pattern from the logical to physical mapping table 231, 431. For example, in response to determining that the second data is the pattern data, the controller 250, 450 may identify the data pattern stored in the physical region of the logical to physical mapping table 231, 431.

In an embodiment, in operation 909, in response to the controller 250, 450 identifying the data pattern stored in the physical region of the logical to physical mapping table 231, 431 in operation 907, the controller 250, 450 may restore the second data on the basis of the data pattern. In an embodiment, the controller 250, 450 may restore the second data by continuously repeating the data pattern to have the same amplitude as an amplitude of a page. In an embodiment, the controller 250, 450 may restore the second data by repeating the data pattern as much as a number dividing the amplitude of the page by a bit unit of the data pattern. For example, in response to the controller 250, 450 identifying the data pattern as a bit value '1001' of 4 bits and the amplitude of the page being 16 bits, the controller 250, 450 may restore 1001100110011001 as the second data by repeating the data pattern 1001 four times.

In an embodiment, in response to the controller 250, 450 determining that the second data is not the pattern data in operation 905, in operation 911, the controller 250, 450 may obtain the second data on the basis of the physical address stored in the physical region of the logical to physical mapping table 231, 431. For example, the controller 250, 450 may identify data having been stored in a location of the first memory 230, 430 indicated by the physical address mapped to the logical address related with the second data, as the second data.

In an embodiment, in operation 913, in response to obtaining the second data, the controller 250, 450 may transmit the obtained second data to the host device 210, 410.

In an embodiment, at least one operation among operation 903 to operation 909 may be performed by hardware (or a hardware logic or circuit) (or a dedicated hardware) controlled by software or the controller 250, 450.

Figure 10:
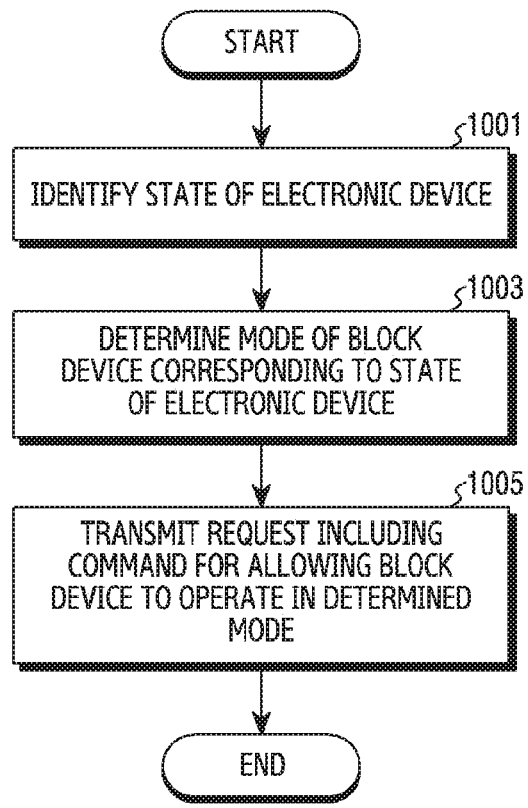
FIG. 10 is a flowchart for explaining a mode of an electronic device for operating a method for processing data, according to various embodiments of the present disclosure.

FIG. 10 is a flowchart for explaining a mode of the electronic device 101 for operating a method for processing data, according to various embodiments of the present disclosure.

In an embodiment, in operation 1001, the host device 210, 410 (e.g., the processor 120) may identify a state of the electronic device 101.

In an embodiment, the state of the electronic device 101 may include a current storage capacity (or storage space) of the block device 220, 420 (e.g., the first memory 230). In an embodiment, the host device 210, 410 may identify whether the current storage capacity of the block device 220, 420 is equal to or is less than a specified capacity. For example, the host device 210, 410 may identify whether the storage capacity of the block device 220, 420 is equal to or is less than 1 gigabyte (Gbyte).

In an embodiment, the state of the electronic device 101 may include a user configuration for data processing. The configuration for data processing may include a first configuration of storing a data pattern of first data in a physical region of the logical to physical mapping table 231, 431 according to whether the first data is pattern data or storing a physical address, and a second configuration of storing a physical address of the first data in the physical region of the logical to physical mapping table 231, 431 regardless of whether the first data is the pattern data. The first configuration or the second configuration may be configured (or selected) by a user input.

In an embodiment, in operation 1003, the host device 210, 410 may determine a mode of the block device 220, 420 corresponding to the state of the electronic device 101.

In an embodiment, in response to the host device 210, 410 identifying that a current storage capacity of the block device 220, 420 exceeds a specified capacity, the host device 210, 410 may determine (or turn on the first mode) to operate the block device 220, 420 in a first mode of storing a data pattern of first data in the physical region of the logical to physical mapping table 231, 431 according to whether the first data is the pattern data or storing a physical address.

In an embodiment, in response to the host device 210, 410 identifying that the current storage capacity of the block device 220, 420 is equal to or is less than the specified capacity, the host device 210, 410 may determine (or turn off the first mode) to operate the block device 220, 420 in a second mode of storing the physical address of the first data in the physical region of the logical to physical mapping table 231, 431 regardless of whether the first data is the pattern data.

In an embodiment, in response to identifying that a user configuration for data processing is configured as the first configuration, the host device 210, 410 may determine to operate the block device 220, 420 in the first mode.

In an embodiment, in response to identifying that a user configuration for data processing is configured as the second configuration, the host device 210, 410 may determine to operate the block device 220, 420 in the second mode.

In an embodiment, in operation 1005, the host device 210, 410 may transmit a request including a command for allowing the block device 220, 420 to operate in the determined mode (e.g., a first mode or a second mode), to the block device 220, 420.

For example, the host device 210, 410 may transmit a request including a command for allowing the block device 220, 420 to operate in the determined mode to the block device 220, 420 through a driver related with the block device 220, 420 included in the operating system 142. Though not illustrated in FIG. 10, the block device 220, 420 may operate in the mode determined in operation 1003, on the basis of the request received from the host device 210, 410.

A method for processing data of various embodiments of the present disclosure may include receiving, by a controller of a block device included in the electronic device, a write request for first data from a host device included in the electronic device, and determining whether the first data is pattern data configured in a form of repeating a specified number of bit values, and in response to determining that the first data is the pattern data, controlling the first memory included in the block device to map the specified number of bit values of the first data with a logical address indicated by the write request and store the specified number of bit values in a logical to physical mapping table.

In various embodiments, controlling the first memory may include controlling the first memory to store the specified number of bit values of the first data in a physical region corresponding to a logical region where the logical address has been stored within the logical to physical mapping table.

In various embodiments, determining whether the first data is the pattern data configured in the form of repeating the specified number of bit values may include specifying the repeated number of bit values, and identifying the specified number of bit values within the first data, and by continuously repeating the identified bit value, providing comparison data having the same amplitude as an amplitude of a page, and identifying whether the first data is identical with the comparison data, and in response to it being identified that the first data is identical with the comparison data, determining the first data as the pattern data.

In various embodiments, the specified number is less than a bit count of the physical region of the logical to physical mapping table and corresponds to a divisor of the amplitude of the page.

In various embodiments, determining whether the first data is the pattern data configured in the form of repeating the specified number of bit values may include, in response to an amplitude of the first data being greater than the amplitude of the page, splitting the first data by the amplitude of the page and determining whether each of parts of the split first data is the pattern data.

In various embodiments, controlling the first memory may further include storing a flag indicating whether the first data corresponds to the pattern data in the logical to physical mapping table.

In various embodiments, the method may further include providing a pattern data bit map including the flag indicating whether the first data corresponds to the pattern data.

In various embodiments, the method may further include receiving a read request for second data from the host device, and loading part of the logical to physical mapping table including a logical address indicated by the read request, to the second memory.

In various embodiments, the method may further include determining whether the second data is the pattern data on the basis of a flag indicating whether the second data corresponds to the pattern data and being stored in the logical to physical mapping table, and in response to determining that the second data is the pattern data, identifying a specified number of bit values which configure the pattern data in a form of being stored and repeated in a physical region of the loaded logical to physical mapping table, and by repeating the identified specified number of bit values to have the same amplitude as the amplitude of the page, restoring the second data.

In various embodiments, the method may further include determining whether the second data is the pattern data on the basis of a pattern data bit map including a flag indicating whether the second data corresponds to the pattern data, and in response to determining that the second data is the pattern data, identifying a specified number of bit values which configure the pattern data in a form of being stored and repeated in a physical region of the loaded logical to physical mapping table, and by repeating the identified specified number of bit values to have the same amplitude as the amplitude of the page, restoring the second data.

Also, a data structure used in the aforementioned embodiment of the present disclosure may be recorded in a computer-readable recording medium through various means. The computer-readable recording medium includes a storage medium such as a magnetic storage medium (for example, a read only memory (ROM), a floppy disc, a hard disc, etc.) and/or an optical reading medium (for example, a compact disc-ROM (CD-ROM), a digital versatile disc (DVD), etc.).

In an embodiment, a computer-readable recording medium may record a program for, in the electronic device 102, executing receiving, by a controller of a block device included in the electronic device, a write request for first data from a host device included in the electronic device, and determining whether the first data is pattern data configured in a form of repeating a specified number of bit values, and in response to determining that the first data is the pattern data, controlling the first memory included in the block device to map the specified number of bit values of the first data with a logical address indicated by the write request and store the specified number of bit values in a logical to physical mapping table.

Until now, a description has been made for the present disclosure focusing on preferred embodiments. A person having ordinary skill in the art to which the present disclosure pertains would be able to understand that the present disclosure may be implemented in a modified form within a scope not departing from the essential characteristics of the present disclosure. Therefore, the disclosed embodiments should be taken into consideration in a descriptive aspect, not in a restrictive aspect. The scope of the present disclosure is presented in claims, not in the above-mentioned description, and it will have to be construed that all differences within a scope equivalent thereto are included in the present disclosure.

The invention claimed is:

1. An electronic device comprising:
   a host device; and
   a block device electrically connected to the host device, wherein the block device comprises:
   a first memory including a first memory region including a data region and a second memory region including a logical to physical mapping table indicating a mapping between a physical address of data stored in the data region of the first memory region and a logical address corresponding to the physical address, wherein the logical to physical mapping table includes a physical region storing the physical address and a logical region corresponding to the physical region; and
   a controller electrically connected to the first memory, wherein the controller is configured to:
   receive a write request from the host device, wherein the write request includes a first logical address and first data;
   determine whether the first data is pattern data configured in a form of repeating a specified number of bit values; and
   in response to determining that the first data is the pattern data, control the first memory to store the specified number of bit values of the first data in a first physical region included in the logical to physical mapping table of the second memory region of the first memory,
   wherein the first memory region of the first memory is a different memory region than the second memory region of the first memory,
   wherein the first physical region corresponds to a region in which the first logical address is stored, and
   wherein the first data has a form in which the specified number of bit values are repeated.

2. The electronic device of claim 1, wherein the controller is configured to:
   specify the repeated number of bit values;
   identify the specified number of bit values within the first data;
   by continuously repeating the identified bit value, providing comparison data having the same amplitude as an amplitude of a page;
   identify whether the first data is identical with the comparison data; and
   in response to identifying that the first data is identical with the comparison data, determine the first data as the pattern data.

3. The electronic device of claim 2, wherein the specified number is less than a bit count of the first physical region of the logical to physical mapping table and corresponds to a divisor of the amplitude of the page.

4. The electronic device of claim 2, wherein the controller is configured to, in response to an amplitude of the first data being greater than the amplitude of the page, split the first data by the amplitude of the page and determine whether each part of the split first data is the pattern data.

5. The electronic device of claim 1, wherein the controller is configured to store a flag indicating whether the first data corresponds to the pattern data in the logical to physical mapping table, or provide a pattern data bit map comprising the flag indicating whether the first data corresponds to the pattern data.

6. The electronic device of claim 1, further comprising a second memory, and
wherein the controller is configured to:
receive a read request for second data from the host device;
load part of the logical to physical mapping table comprising a second logical address indicated by the read request, to the second memory, and determine whether the second data is the pattern data on the basis of a flag indicating whether the second data corresponds to the pattern data and being stored in the logical to physical mapping table;
in response to determining that the second data is the pattern data, identify a specified number of bit values which configure the pattern data in a form of being stored and repeated in a second physical region corresponding to the second logical address of the loaded logical to physical mapping table; and
by repeating the identified specified number of bit values to have the same amplitude as the amplitude of the page, restore the second data.

7. The electronic device of claim 6, wherein the controller is configured to:
determine whether the second data is the pattern data on the basis of a pattern data bit map comprising the flag indicating whether the second data corresponds to the pattern data;
in response to determining that the second data is the pattern data, identify the specified number of bit values which configure the pattern data in a form of being stored and repeated in the second physical region of the loaded logical to physical mapping table; and
by repeating the identified specified number of bit values to have the same amplitude as the amplitude of the page, restore the second data.

8. A method for processing data in an electronic device, the method comprising:
receiving, by a controller of a block device comprised in the electronic device, a write request from a host device comprised in the electronic device, wherein the write request includes a first logical address and first data;
determining whether the first data is pattern data configured in a form of repeating a specified number of bit values; and
in response to determining that the first data is the pattern data, controlling a first memory comprised in the block device, the first memory including a first memory region including a data region and a second memory region, to store the specified number of bit values of the first data in a first physical region included in a logical to physical mapping table comprised in the second memory region of the first memory,
wherein the first memory region of the first memory is a different memory region than the second memory region of the first memory,
wherein the first physical region corresponds to a region in which the first logical address is stored in the logical to physical mapping table, and
wherein the first data has a form in which the specified number of bit values are repeated.

9. The method of claim 8, wherein determining whether the first data is the pattern data configured in the form of repeating the specified number of bit values comprises:
specifying the repeated number of bit values;
identifying the specified number of bit values within the first data;
by continuously repeating the identified bit value, providing comparison data having the same amplitude as an amplitude of a page;
identifying whether the first data is identical with the comparison data; and
in response to identifying that the first data is identical with the comparison data, determining the first data as the pattern data.

10. The method of claim 9, wherein the specified number is less than a bit count of the first physical region of the logical to physical mapping table and corresponds to a divisor of the amplitude of the page.

11. The method of claim 9, wherein determining whether the first data is the pattern data configured in the form of repeating the specified number of bit values comprises, in response to an amplitude of the first data being greater than the amplitude of the page, splitting the first data by the amplitude of the page and determining whether each of parts of the split first data is the pattern data.

12. The method of claim 8, wherein controlling the first memory further comprises storing a flag indicating whether the first data corresponds to the pattern data in the logical to physical mapping table, or providing a pattern data bit map comprising the flag indicating whether the first data corresponds to the pattern data.

13. The method of claim 8, further comprising:
receiving a read request for second data from the host device;
loading part of the logical to physical mapping table comprising a logical address indicated by the read request, to a second memory;
determining whether the second data is the pattern data on the basis of a flag indicating whether the second data corresponds to the pattern data and being stored in the logical to physical mapping table;
in response to determining that the second data is the pattern data, identifying a specified number of bit values which configure the pattern data in a form of being stored and repeated in a second physical region of the loaded logical to physical mapping table; and
by repeating the identified specified number of bit values to have the same amplitude as the amplitude of the page, restoring the second data.

* * * * *